(12) United States Patent
Castiglioni

(10) Patent No.: US 6,209,512 B1
(45) Date of Patent: Apr. 3, 2001

(54) SMALL-DIMENSION TWO OR FOUR STROKE VEHICLE ENGINE WITH STRATIFIED FEED

(75) Inventor: Claudio Castiglioni, Varese (IT)

(73) Assignee: MV Agusta Motor S.p.A. (IT)

(*) Notice: Subject to any disclaimer, the term of this patent is extended or adjusted under 35 U.S.C. 154(b) by 0 days.

(21) Appl. No.: 09/202,810

(22) PCT Filed: Apr. 8, 1998

(86) PCT No.: PCT/EP98/02049

§ 371 Date: Dec. 22, 1998

§ 102(e) Date: Dec. 22, 1998

(87) PCT Pub. No.: WO98/53189

PCT Pub. Date: Nov. 26, 1998

(30) Foreign Application Priority Data

May 20, 1997 (IT) .............................................. MI97A1173

(51) Int. Cl.[7] ...................................................... F02M 1/00
(52) U.S. Cl. ............................................ 123/275; 123/276
(58) Field of Search ................................ 123/90.1, 90.2, 123/90.23, 90.17, 124, 275, 276, 295, 299, 305

(56) References Cited

U.S. PATENT DOCUMENTS

| | | | |
|---|---|---|---|
| 1,866,300 | * 7/1932 | French | 123/275 |
| 2,587,339 | * 2/1952 | Rostu | 123/275 |
| 2,615,437 | * 10/1952 | Broderson | 123/275 |
| 4,682,573 | 7/1987 | Fujikawa et al. | 123/90.2 |
| 4,716,861 | 1/1988 | Fujikawa et al. | 123/90.23 |
| 4,722,306 | 2/1988 | Fujikawa et al. | 123/90.2 |

\* cited by examiner

Primary Examiner—John Kwon
(74) Attorney, Agent, or Firm—Steinberg & Raskin, P.C.

(57) ABSTRACT

A two or four stroke valve engine including at least one cylinder (3) within which a piston (4) moves and which receives an air-fuel mixture via at least one induction or intake duct (16). For the combustion products, at least one exhaust duct (17) is operationally connected to the cylinder. The intake duct (16) and the exhaust duct (17) each are provided with at least one respective valve member (18, 19) subjected to an operator device (25, 26) to open it during the use of the engine, and a closure device (28) retuning the valve member (18, 19) into the position in which it closes the respective duct (16, 17). The valve members (18, 19) are positioned to the side of the cylinder (3) and intercept apertures (16A, 17A) of the respective ducts (16, 17), which open into at least one mixing chamber (13) positioned to the side of the cylinder (3) and communicating with it. At least in correspondence with the chamber (13), an ignition device (8) for the mixture present in it is provided.

11 Claims, 4 Drawing Sheets

SMALL-DIMENSION TWO OR FOUR STROKE VEHICLE ENGINE WITH STRATIFIED FEED

FIELD OF THE INVENTION

The present invention relates to a two or four stroke vehicle engine, and in particular to a two or four stroke vehicle engine adapted to optimize the combustion process, especially when the engine is operating at a low load.

BACKGROUND OF THE INVENTION

In the field of vehicle engines, the need is felt to reduce fuel consumption and also possibly size and weight, leading to further reduced fuel consumption. Fuel consumption can be reduced in various ways, in particular when an engine operates at low r.p.m. and low load. One of these ways consists of especially shaping the explosion chamber by providing the piston head with concave or convex shapes which, with the top of the cylinder, define a combustion chamber of small volume (compared with the usually available combustion chamber) when the piston is at its top dead center. The fuel is injected directly into this chamber, into which there opens the induction duct which is provided with its own valve member. In this chamber there is also located an ignition means (spark plug) for the mixture which is created in it. By this means a suitable reduced-volume stratification of the air-fuel mixture can be obtained, such as to allow the engine to operate at low load. In this case, the piston moves into proximity with the top dead center to hence define the aforesaid reduced chamber into which only that fuel quantity for locally achieving mixture ignition conditions is fed. If however the engine has to operate at higher load and/or r.p.m., fuel is fed into the cylinder before the piston reaches its top dead center, so as to create a homogeneous feed.

Other methods are known comprising the provision of mixing prechambers at the top of the cylinder, combined or otherwise with a variously shaped piston head. The explosive mixture forms in these chambers and is fed, under more or less turbulent flow conditions, into the cylinder and the possible cavity present within the piston head.

Although these methods result in lower fuel consumption at low loads or allow good fuel-air mixing, they are often difficult and/or costly to implement (for example, with regard to the arrangement of the valve member and the means for its opening or closure), and usually require the use of particular metals or light metal alloys for constructing their components.

In addition to the aforegoing, the known methods result in large engine dimensions above the cylinder. In other words, the engine head assumes a considerable size.

OBJECTS AND SUMMARY OF THE INVENTION

An object of this invention is to provide an engine which is improved compared with known engines.

A particular object of the invention is to provide an engine of the aforesaid type which achieves reduced fuel consumption and lesser pollution by extremely simple means, so involving relatively low cost.

A further object is to enable an engine of the stated type, by virtue of its conformation, to use non-valuable metals (such as cast iron) for its construction, and to control its valve members in an extremely simple manner.

A further object is to provide an engine of the stated type which is of small dimensions, at least with regard to its head.

These and further objects which will be apparent to one of ordinary skill in the art are attained by an engine in accordance with the accompanying claims.

BRIEF DESCRIPTION OF THE DRAWINGS

The invention will be more apparent from the accompanying drawing, which is provided by way of non-limiting example and on which.

DETAILED DESCRIPTION OF THE PREFERRED

Figure 1:
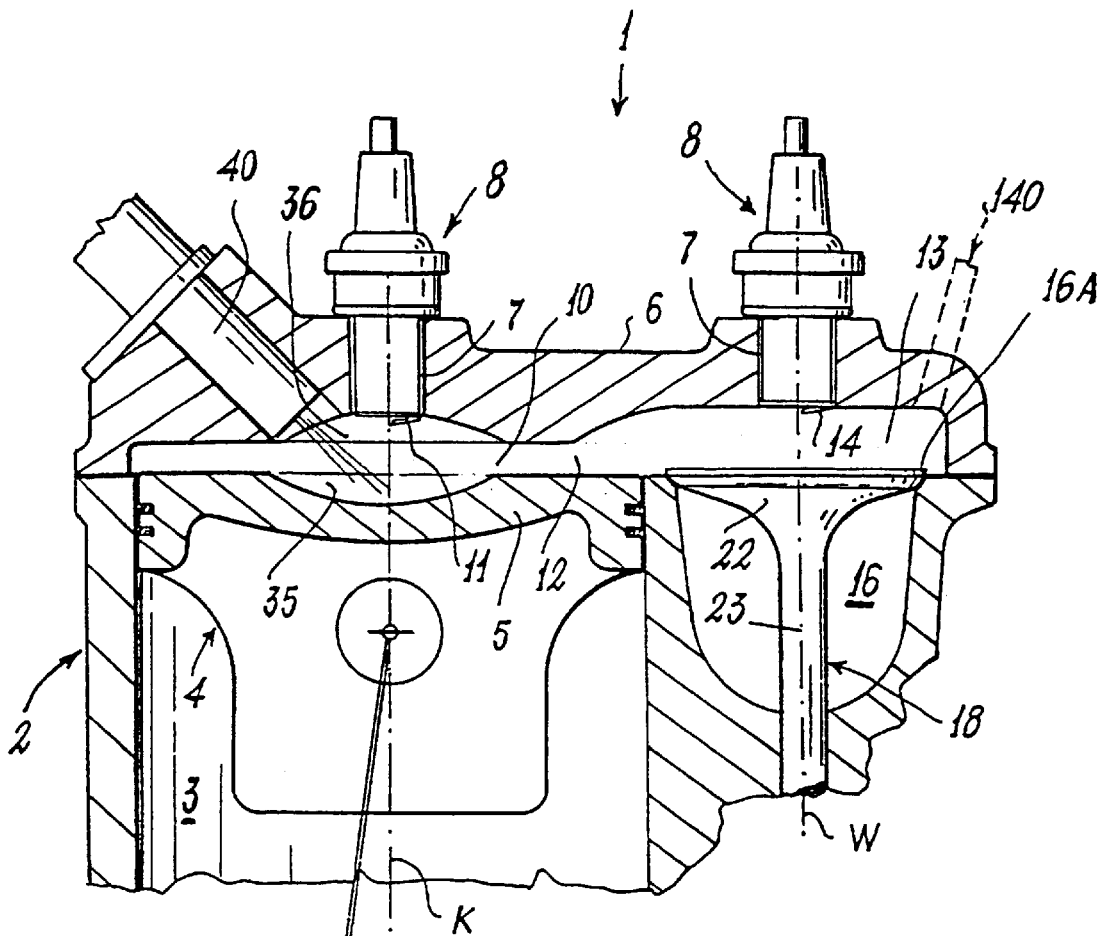
FIG. 1 is a partial sectional schematic view of part of an engine of the invention, shown during the use of the engine at minimum power.

With reference to said figures, an engine is indicated overall by 1 and comprises a casing or cylinder block 2 in which at least one cylinder 3 is provided. Within this latter a piston 4 provided with a head 5 moves with reciprocating movement. The casing 2 is closed upperly by a cylinder head 6 which in the example comprises seats 7 for spark plugs 8.

Above the piston 4 there is provided an explosion chamber 10 into which the electrode 11 of a spark plug 8 penetrates. Via a duct or passage 12, the chamber 10 communicates with a mixing chamber 13 into which the electrode 14 of a second spark plug 8 penetrates. An intake or induction duct 16 and an exhaust duct 17 open into this chamber via apertures 16A and 17A. Valve members 18 and 19 for shutting these apertures (16A and 17A respectively) are positioned on one side of the cylinder 3. In the example, these members are both positioned on the same side of the cylinder with their axis W parallel to the cylinder axis K. However they can also be arranged in different positions and at a distance from each other, provided they lie to the side of the cylinder. Likewise the axis W can be arranged in any manner relative to the cylinder axis K.

Figure 3:
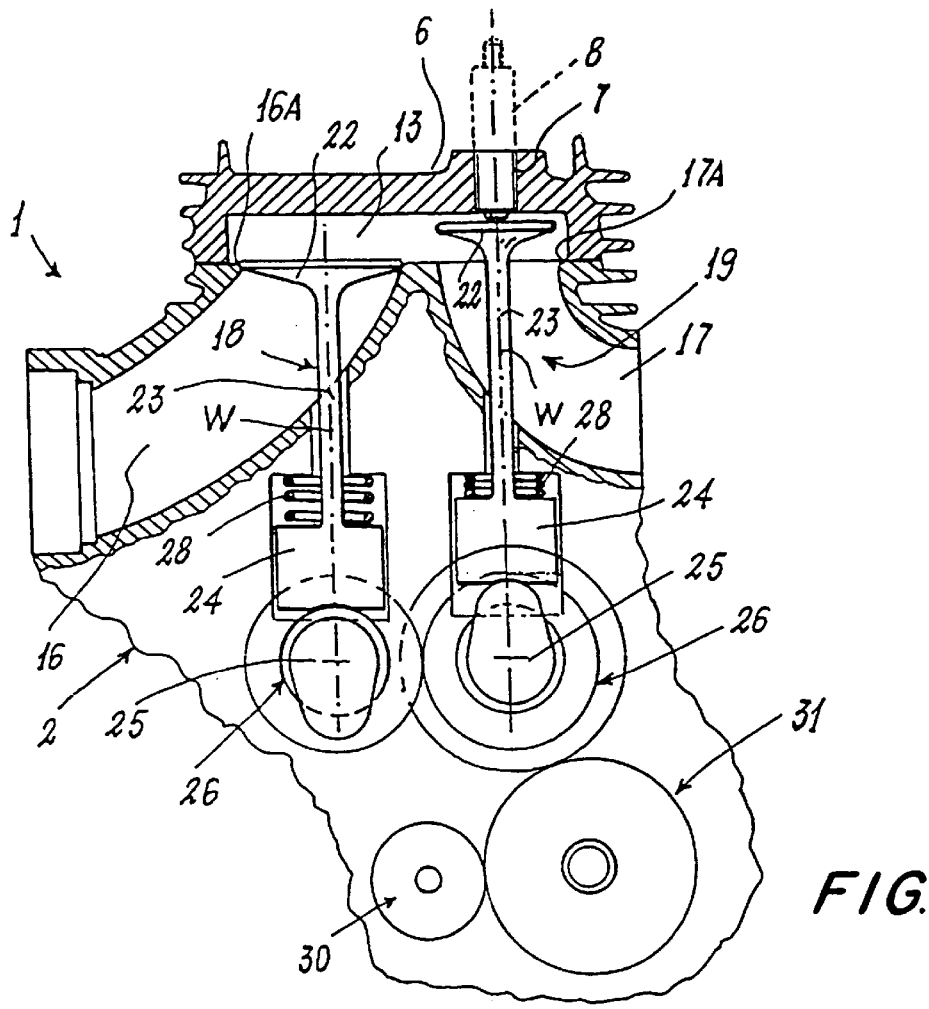
FIG. 3 is a partial schematic side view of the engine of FIG. 1 or 2 with some parts shown in section.
Figure 3A:
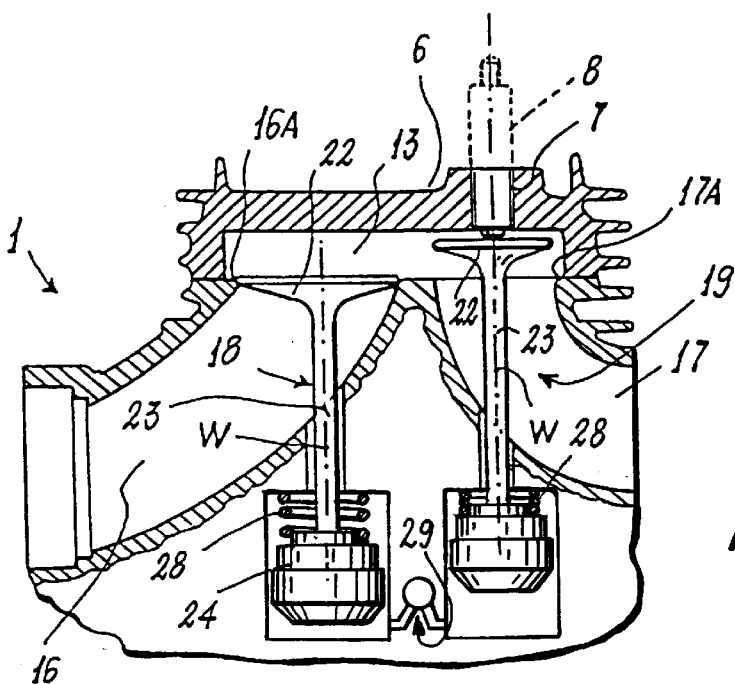
FIG. 3a is a similar view to FIG. 3 showing hydraulic means for opening and closing the valve members (18, 19).
Figure 4:
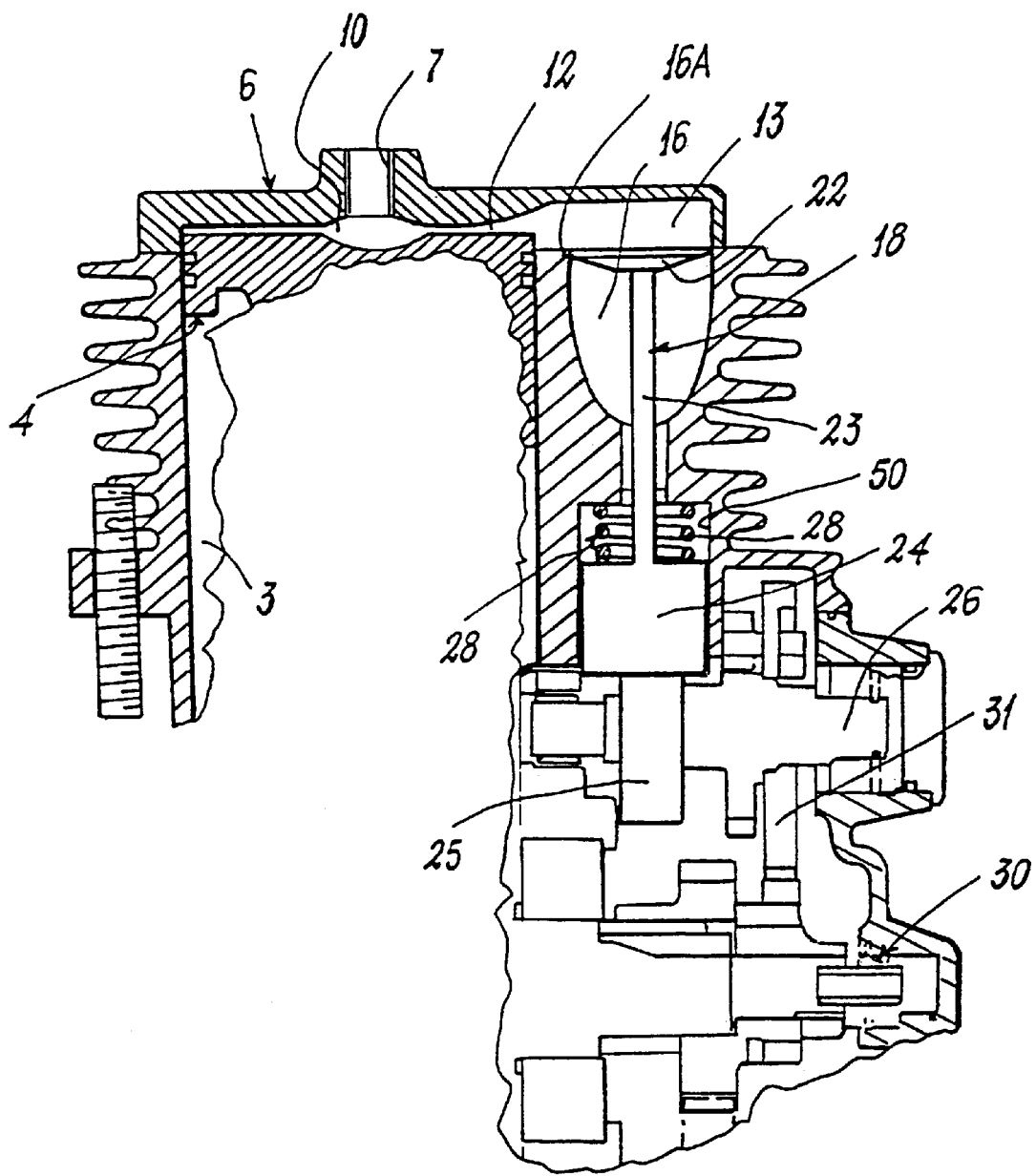
FIG. 4 is a view similar to FIG. 1, but showing a larger extent of the engine of the invention.

Each valve member or valve 18 and 19 has a head 22 arranged to cooperate with the corresponding aperture 16A or 17A, a stem 23 and a cup-shaped member 24 subjected to the action of a spring 28 and inserted into a corresponding seat 50 in the cylinder block 2. A cam 25 of a camshaft 26 acts on said member. In the example two camshafts are provided for opening the valves (which are positioned with their heads facing the cylinder head 6). However, for opening said valve members other known means (hydraulic or other) can be provided, operating either directly or via linkages comprising rocker levers. For example, as shown in FIG. 3a, the valves may be operated by hydraulic means 29. Said camshafts are driven by the crankshaft 30 via an idle gear 31 and without interposed belts or other transmission means. This results in a very compact operating unit for the valve members.

The ducts 16 and 17 can be of various inclinations and shapes, to optimize the engine operation. In particular, the inclination of the exhaust duct 17 can be between 0° and 20° to the cylinder axis K to achieve said optimization.

Figure 2:
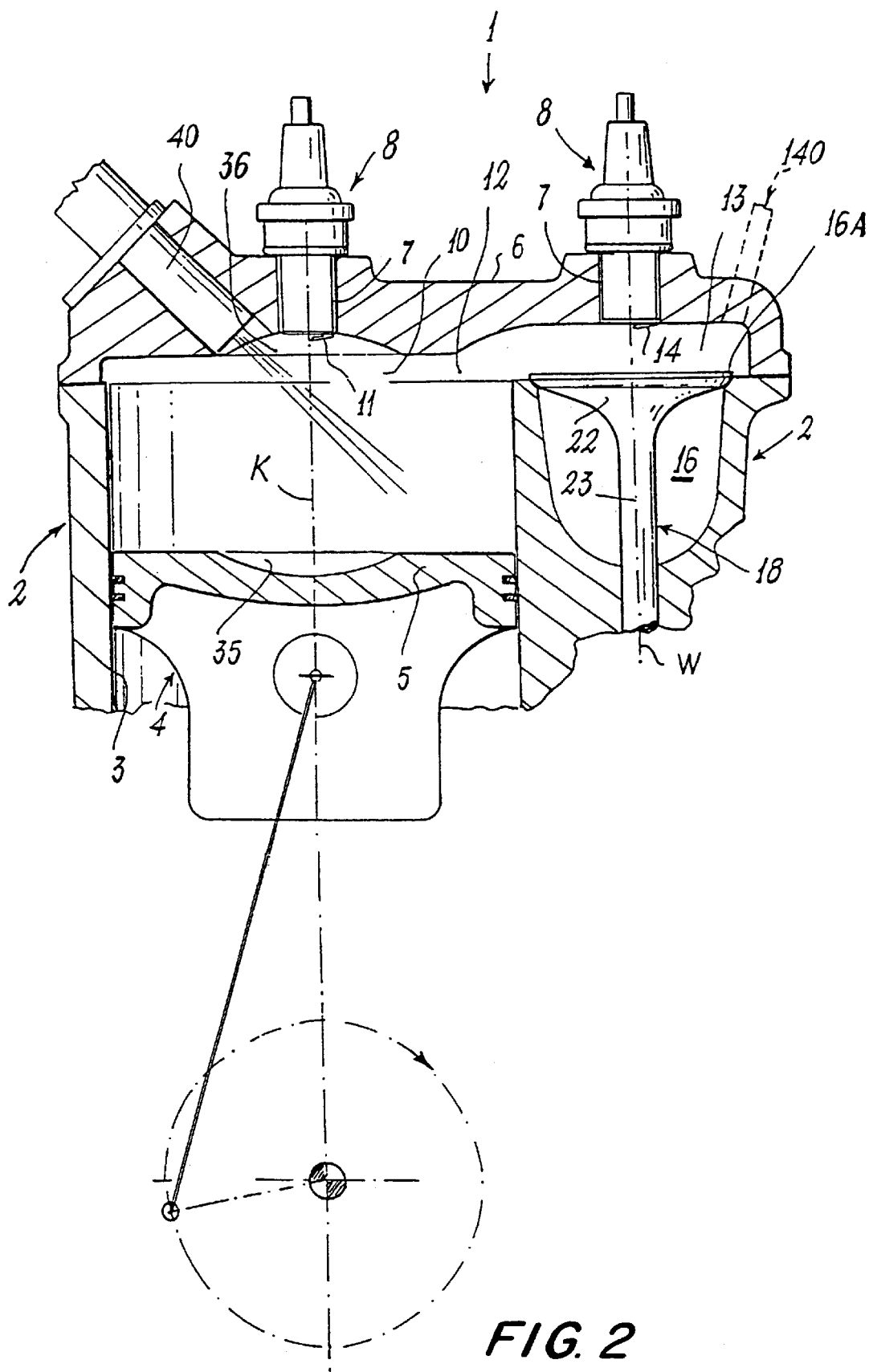
FIG. 2 is a view similar to FIG. 1, but shown during the use of the engine at maximum power.

The head 5 of the piston 4 can be flat or, as in the figures, be shaped at least partly concave or convex. For example the head 5 can comprise a recess (hemispherical or partly spherical) 35 positioned in correspondence with a recess 36 into which the seat for the spark plug 8 opens. These recesses 35 and 36 define within the explosion chamber 10 an enlargement into which the fuel is injected, via a usual injector 40, when the piston is at its top dead center and the engine operates at low load or low r.p.m. (FIG. 1). If the engine operates at higher r.p.m., injection occurs before the piston reaches the top dead center, as shown in FIG. 2.

By virtue of the invention the engine cylinder head 6 is substantially flat, while the increase in cylinder block width (due to the presence of the valve members 18, 19) is very small. This enables engines to be constructed having a height less than known engines, this being advantageous in any field in which special engine requirements exist. In this respect, said characteristic can result in advantages of an aerodynamic type, contributing to low fuel consumption.

The use of the engine is apparent from the aforegoing description and will not be described. It should be merely noted that the particular form of the mixing chamber 13 to the side of the explosion chamber enables optimum stratification of the explosive mixture to be obtained within the cylinder, so optimizing engine operation. The fuel can be fed directly into such a mixing chamber via a suitable injector 140 used in addition to or instead of that indicated by 40 in FIGS. 1 and 2.

A preferred embodiment of the invention has been described. Others are however possible (such as an embodiment comprising a single spark plug 8 positioned for example in correspondence with the mixing chamber 13, or more than one mixing chamber communicating with the cylinder), and are to be considered as falling within the scope of this invention.

What is claimed is:

1. A two- or four-stroke vehicle comprising, within a cylinder block (2) closed by a cylinder head (6), at least one cylinder (3) within which a piston (4) moves, said piston having a head (5), the cylinder (3) receiving air via at least one induction or intake duct (16), there being provided for the combustion products at least one exhaust duct (17) operationally connected to said cylinder, said intake duct (16) and said exhaust duct (17) each being provided with at least one respective valve member (18,19) subjected to operator means (28) returning said valve member (18,19) to the position in which it closes the respective duct (16,17), the valve members (18,19) being positioned by the side of the cylinder (3) and intercepting apertures (16A,17A) of the respective ducts (16,17) which open into at least one mixing chamber (13) positioned by the side of the cylinder (3) and communicating with it, said cylinder head (6) being substantially flat, the head (5) of the piston (4) comprising at least one surface recess (35), the engine further comprising at least an injector (40,140) located inside the cylinder head (6), and wherein said injector is structured and arranged to inject said fuel into a top portion of said cylinder and into said surface recess and wherein said mixing chamber maintains communication with said cylinder throughout an entire stroke of said piston including when said piston is at a top dead center position whereby optimum stratification of the explosive mixture above the piston (4) is obtained and optimum engine operation is achieved, in particular when the engine operates at low load.

2. An engine as claimed in claim 1 wherein the injector (40) is located above the cylinder (3).

3. An engine as claimed in claim 1 wherein the injector (40) is inclined in respect of the axis (W) of the cylinder (3).

4. An engine as claimed in claim 1, wherein a second injector (140) is located over the mixing chamber (13), is connected to the cylinder head (6) and injects the fuel into said chamber (13).

5. An engine as claimed in claim 1, wherein the cylinder head (6) comprises a recess (36) positioned in correspondence with the recess (35) into the piston head (5).

6. An engine as claimed in claim 1 wherein an ignition member (9) opens into the recess (36) of the cylinder head (6).

7. An engine as claimed in claim 1, wherein the recess (35,36) is hemispherical.

8. An engine as claimed in claim 1 wherein the recess (35,36) is partly spherical.

9. An engine as claimed in claim 1 wherein hydraulic means for opening and closing the valve members (18,19) are provided.

10. The engine as claimed in claim 1, wherein said injector is structured and arranged to enable the injection of said fuel into said cylinder when said piston head is in a plurality of positions including a top dead center position.

11. The engine as claimed in claim 10, wherein said mixing chamber is arranged at a top end of said cylinder.

* * * * *